United States Patent
Hourunranta et al.

(10) Patent No.: US 6,704,281 B1
(45) Date of Patent: Mar. 9, 2004

(54) BIT-RATE CONTROL IN A MULTIMEDIA DEVICE

(75) Inventors: Ari Hourunranta, Tampere (FI); Marko Luomi, Tampere (FI); Pasi Ojala, Lempäälä (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/483,143

(22) Filed: Jan. 13, 2000

(30) Foreign Application Priority Data

Jan. 15, 1999 (FI) .................................................. 990073

(51) Int. Cl.[7] .............................................. H04L 12/26
(52) U.S. Cl. ....................................... 370/230; 370/465
(58) Field of Search ................................ 370/229, 230, 370/230.1, 231, 232, 233, 234, 395.4, 395.41, 465, 486, 487, 493, 494, 495, 535, 537, 538, 540; 375/240, 240.01, 240.02, 240.05, 240.07, 240.23

(56) References Cited

U.S. PATENT DOCUMENTS

| | | | | |
|---|---|---|---|---|
| 5,285,276 A | * | 2/1994 | Citta | 375/240.12 |
| 5,392,284 A | * | 2/1995 | Sugiyama | 370/465 |
| 5,475,686 A | | 12/1995 | Bach et al. | 370/84 |
| 5,506,844 A | * | 4/1996 | Rao | 370/468 |
| 5,534,937 A | * | 7/1996 | Zhu et al. | 375/240.27 |
| 5,550,580 A | | 8/1996 | Zhou | 348/15 |
| 5,734,677 A | * | 3/1998 | Liew et al. | 375/240 |
| 5,754,554 A | * | 5/1998 | Nakahara | 370/498 |
| 6,091,776 A | * | 7/2000 | Linzer | 375/240.12 |
| 6,504,850 B1 | * | 1/2003 | Kato et al. | 370/465 |

FOREIGN PATENT DOCUMENTS

| | | |
|---|---|---|
| EP | 0534493 A2 | 3/1993 |
| EP | 0784409 A2 | 7/1997 |
| JP | 53-113414 | 3/1978 |
| WO | WO 98/41021 | 9/1998 |

OTHER PUBLICATIONS

"Video Codec Test Model, Near–Term, Version 8 (TMN8)", ITU—Telecommunications Standardization Sector, Document Q15–A–59.

"Toll Quality Variable–Rate Speech Codec", P. Ojala, Speech and Audio Systems Laboratory, Nokia Research Center.

"The Multimodal Multipulse Excitation Vocoder", Unno et al., IEEE copyright 1997.

* cited by examiner

*Primary Examiner*—Kwang Bin Yao
(74) *Attorney, Agent, or Firm*—Perman & Green, LLP

(57) ABSTRACT

A multimedia terminal comprising: a first encoder (100) for producing a first bit-stream (107) of a first media type and having a first bit-rate; a second encoder (110) for producing a second bit-stream (112) of a second media type and having a second bit-rate; a multiplexer (120) for combining at least the first (106) and the second (112) bit-streams into a third bit-stream (123). The terminal comprises an input element (130) for receiving preference information (131) coupled to the first encoder (100) and the second encoder (110), said preference information (131) indicating a preferred combination of the first and the second media types in the third bit-stream and affecting the first and the second bit-rates. Thus, the transmission capacity is utilised in a more optimised manner and the proportions of different media types are better adjusted to the purpose of the information transfer.

16 Claims, 6 Drawing Sheets

BIT-RATE CONTROL IN A MULTIMEDIA DEVICE

FIELD OF THE INVENTION

The present invention relates to multimedia terminals and especially a multimedia terminal comprising a first encoder for encoding a first signal for producing a first bit-stream of a first media type and having a first bit-rate, a second encoder for encoding a second signal for producing a second bit-stream of a second media type and having a second bit-rate, and a multiplexer for combining at least the first and the second bit-streams into a third bit-stream.

BACKGROUND OF THE INVENTION

In multimedia transmission, separately encoded bit-streams from a sender's different media sources (e.g. video, audio, data and control) are multiplexed into a single bit-stream, and at the receiving end the bit-stream is again de-multiplexed into various multimedia streams to be decoded appropriately. The block diagram of FIG. 1 illustrates the principle of multiplexing by a prior art solution for combination of encoded speech and video data streams in a videophone terminal. The terminal comprises a video encoder 100 and a speech encoder 110. A speech input signal 114 and a video input signal 106 are fed to corresponding separate encoders where they are processed with encoding algorithms. The resulting encoded bit-streams 112, 107 are fed to relevant bit-stream buffers 111, 101 of the encoders. The bit-stream from the video bit-stream buffer 105 and the bit-stream from the speech bit-stream buffer 113 are input to a multiplexer 120, which combines the separate bit-streams into a composite bit-stream 123 that is forwarded to the transmission means of the multimedia terminal.

Even though the coding algorithms effectively compress data, the limiting factor of the process, especially in terminals that operate over a radio interface, is transmission capacity, and therefore optimization of the use of this limited resource is very important. In videophone solutions the bit-rate of the video encoder output stream is typically controllable, and this has been used to divide the limited transmission resources between the different media types in the multiplexed data flow.

Document ITU Telecommunication Sector, Video Codec Test Model, Near-Term Version 8 (TMN8), Document Q15-A-59, Portland, Jun. 24–27, 1997 describes a typical prior art videophone application, where the constant bit-stream of the speech encoder is first defined, after which the variable-rate video encoder output stream is adapted to the remaining capacity by adjusting the spatial resolution of the video coding. If the predefined targets are met, the video encoder produces a bit-stream with a constant bit-rate. For situations where at least one (e.g. speech coding) or even more (e.g. signaling) functions are implemented with variable bit-rate, this adjustment scheme is too rigid and the available transmission capability is not optimally utilized, since space may be left unused in the multiplexer buffer.

Furthermore, the use and importance of different media sources vary very much according to the purpose and environment of the connection. Conventionally voice has been given a clear preference over other types of media. When terminals improve and their usage diversifies, preferences in different situations will also change. In some cases voice will be preferred over video, but in other cases good quality transmission of video may be considered more important. Sometimes a good compromise between the two, adjusted to the transmission conditions, would be appreciated. Accordingly, in addition to the inherent need for optimising the use of transmission capacity of a multiplexed multimedia data stream, a need has risen for adjusting the trade-off between different data streams according to the purpose and situation of the user or the condition of transmission link in use.

SUMMARY OF THE INVENTION

Now a multimedia terminal and a method for use in a multimedia terminal have been invented by use of which the presented disadvantages can be reduced and a possibility for meeting the new objectives is enhanced. According to a first aspect of the present invention there is provided a multimedia terminal a first encoder for encoding a first signal for producing a first bit-stream of a first media type and having a first bit-rate, a second encoder for encoding a second signal for producing a second bit-stream of a second media type and having a second bit-rate, a multiplexer for combining at least the first and the second bit-streams into a third bit-stream. The terminal is characterized by comprising an input element for receiving preference information coupled to the first encoder and the second encoder, said preference information indicating a preferred combination of the first and the second media types in the third bit-stream and affecting the first and the second bit-rates.

In the present invention target bit-rates are interactively defined and controlled by control information that affects the encoding function of different encoders. The terminal is provided with means for receiving information that indicates a preference between different media types in the multiplexed bit-stream. The received preference information is used as control information in the encoding processes. Consequently, the transmission capacity is utilised in a more optimised manner and the proportions of different media types are better adjusted to the purpose of the information transfer.

According to a second aspect of the present invention there is provided a protocol for communicating between a first multimedia terminal and a second multimedia terminal, said first multimedia terminal comprising a first encoder for encoding a first signal for producing a first bit-stream of a first media type and having a first bit-rate; a second encoder for encoding a second signal for producing a second bit-stream of a second media type and having a second bit-rate; a multiplexer for combining the first and the second bit-streams into a third bit-stream, said protocol comprising formatted signals for transferring information between the first and the second multimedia terminal. The protocol is characterised by comprising a message for indicating the capability of the first multimedia terminal to control the first and the second bit-rates according to a preference information received by first multimedia terminal, said preference information indicating a preferred combination of the first and the second media types in the third bit-stream and affecting the first and the second bit-rates.

According to a third aspect of the present invention there is provided a method for controlling multiplexing of a multimedia transmission comprising: encoding a first signal for producing a first bit-stream of a first media type and having a first bit-rate; encoding a second signal for producing a second bit-stream of a second media type and having a second bit-rate; combining at least the first and the second bit-streams into a third bit-stream. The method is characterised by receiving preference information, said preference information indicating a preferred combination of the first and the second media types in the third bit-stream; and adjusting the first and the second bit-rates according to the received preference information.

BRIEF DESCRIPTION OF THE DRAWINGS

For a better understanding of the present invention and in order to show how the same may be carried into effect, reference will now be made, by way of example, to the accompanying drawings, in which.

DETAILED DESCRIPTION

Figure 2:
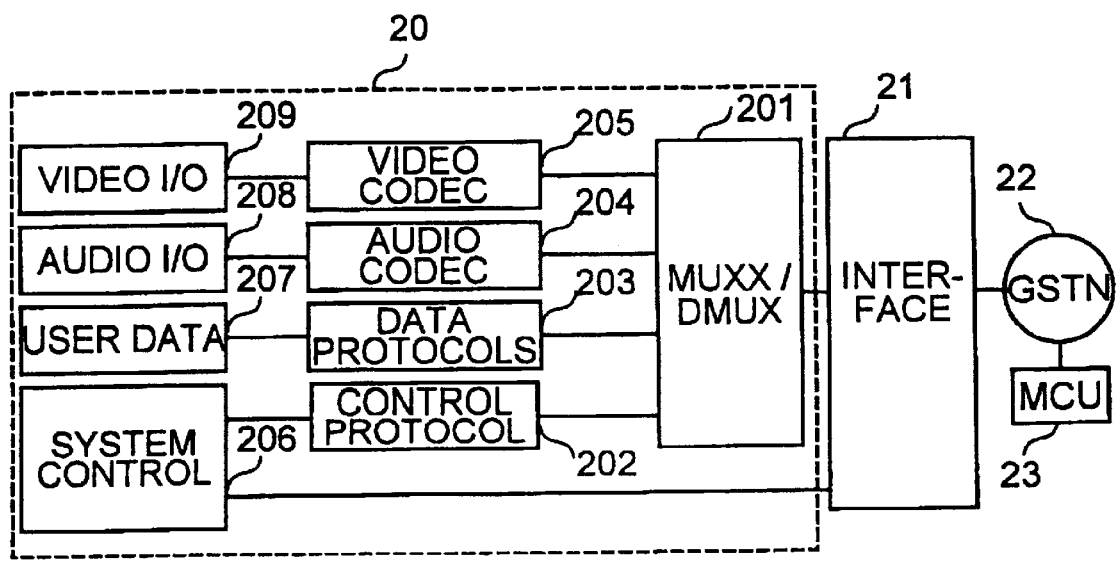
FIG. 2 illustrates a generic H.324 multimedia videophone system.

Notwithstanding other forms of the invention, preferred embodiments thereof will be described in connection with, and using the terminology of H.324 and other associated recommendations for multimedia communication terminals. The functional block diagram of FIG. 2 illustrates a generic H.324 multimedia videophone system. It consists of a terminal unit 20, an interface unit 21, a GSTN (General Switched Telephone Network) network 22, and a multipoint control unit (MCU) 23. H.324 implementations are not required to have each functional element. Mobile terminals may be implemented with any appropriate wireless interface as an interface unit 21 (H.324 Annex C).

The MCU 23 works as a bridge, that centrally directs the flow of information in the GSTN network 22 to allow communication among several terminal units 20. The interface 21 converts the synchronous multiplexed bit-stream into a signal that can be transmitted over the GSTN, and converts the received signal into a synchronous bit-stream that is sent to the multiplex/demultiplex protocol unit 201 of the terminal 20. The Multiplex protocol multiplexes transmitted video, audio, data and control streams into a single bit-stream, and demultiplexes a received bit-stream into various multimedia streams. In addition, it performs logical framing, sequence numbering, error detection, and error correction e.g. by means of retransmission, as appropriate to each media type. The control protocol 202 of the system control 206 provides end-to-end signaling for operation of the multimedia terminal, and signals all other end-to-end system functions. It provides for capability exchange, signaling of commands and indications, and messages to open and fully describe the content of logical channels. The data protocols 203 support data applications 207 such as electronic whiteboards, still image transfer, file exchange, database access, audiographics conferencing, remote device control, network protocols etc. The audio codec 204 encodes the audio signal from the audio I/O equipment 208 for transmission, and decodes the encoded audio stream. The decoded audio signal is played using audio I/O equipment. The video codec 205 carries out coding for video streams originating from the video I/O equipment 209 and decodes encoded video streams for display.

Figure 1:
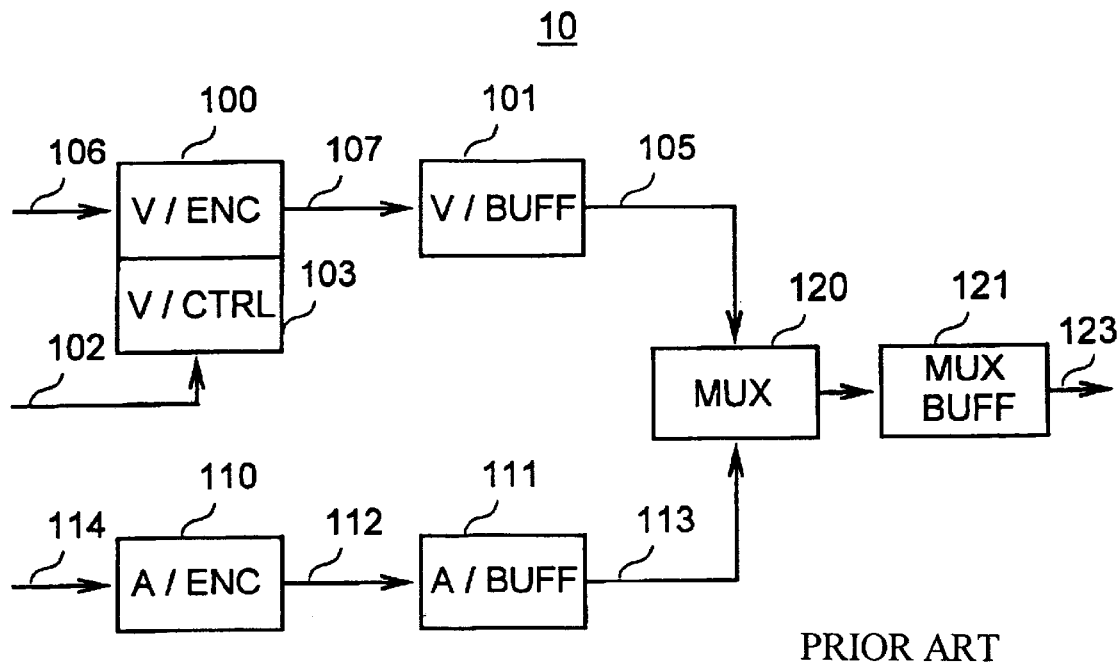
FIG. 1 illustrates a prior art videophone application.

To illustrate the control of variable-rate bit-streams according to the invention, an embodiment of the invention intended to control video and audio bit-streams is discussed herein. Corresponding embodiments can be generated for several bit-streams of other media types. In the prior art videophone application illustrated in FIG. 1, the speech encoder 110 operates at a constant bit-rate, possibly utilising voice activity detection (VAD) and silence frames, as earlier known to a person skilled in the art. The speech encoder bit-stream 112 is first fed to the speech encoder bit-stream buffer 111 from which the buffered bit-stream 113 is fed to the multiplexer 120. The operation of the video encoder 100 is controlled by a bit-rate control element 103 according to a number of video encoder control parameters 102. Generally some allocations (e.g. audio data, control data, multiplexing overheads) from the total available multiplexer buffer 121 are made, and then the total available bit-stream for the video encoder is calculated from the resulting available portion of the multiplexer buffer. Given the available bit-rate, the video encoder 100 is able to deduce a target frame-rate based on prior knowledge of the performance of the video coding algorithms in given bit-rate ranges. In simple terms this corresponds to choosing a frame rate that, for a given bit-rate range, also allows a reasonable spatial quality. Given the available bit-rate and the target frame-rate, the video encoder 100 can calculate the number of bits it can use for each frame (bits per frame, bpf). The video encoder 100 is able to adjust its spatial resolution to meet the bpf requirement by increasing or decreasing its quantization inside a video frame. The video encoder is also able to adjust its temporal resolution to meet the bpf requirement by e.g. dropping some frames to facilitate more coding when a video image with many changes compared to the previous one appears.

Due to this adaptability of the video encoder, the rate control of a multimedia terminal has generally been driven by the multiplexer buffer space and has had greatest effect on the operation of the video encoder. In situations where more than one variable-rate bit-streams is used this situation will change.

Figure 3:
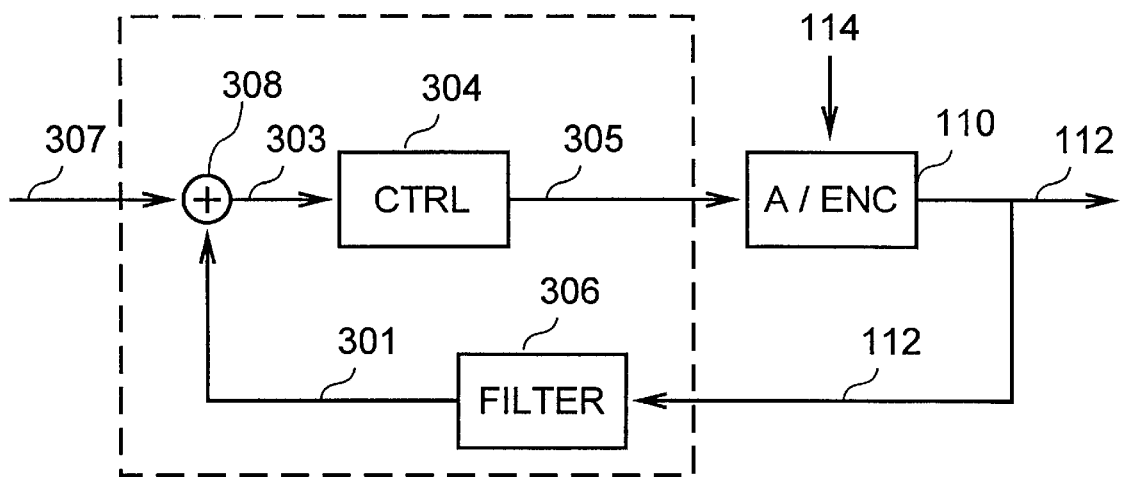
FIG. 3 illustrates an average bit-rate control system for a variable-rate speech encode.

FIG. 3 illustrates an average bit-rate control system for a variable-rate speech encoder. For control purposes, the bit-rate of the bit-stream 112 from the speech encoder 110 is monitored and fed to a feed-back filter 306, where it is averaged to smoothen the short term variations in the bit-rate. The actual averaged bit-rate 301 is subtracted 308 from the target bit-rate 307 of the speech encoder 110 to derive an error signal 303 that is fed to a controller 304 that generates control information 305 for the speech encoder 110. The algorithm used in the speech encoder is adjusted according to the control information received from the controller 304. In the controller 304, any control algorithm or logic can be used. For example, PI (Proportional Integral) type of control, generally known to a person skilled in the art, is possible.

The function of the control loop is substantially to drive the actual average bit-rate 301 to follow the given target bit-rate 307, and the input speech signal 114 can be considered as a disturbance to the control-loop. For example in the case of a source controlled variable-rate encoder, the bit-rate is selected using adaptive thresholds. The input signal 305 from the controller 304 can be used as a tuning factor for the selection of an adaptive threshold for the speech encoder 110. More detailed description of the embodied use of adaptive thresholds for controlling the bit-rate can be found e.g. in the document "Toll quality variable-rate speech codec", Pasi Ojala, Proceedings of IEEE International Conference on Acoustics, Speech and Signal Processing; Munich, Germany, April 1997. In addition to the control of the average bit-rate, the maximum bit-rate of the speech encoder can also be controlled by limiting the use of codebooks requiring the highest bit-rates. Applying control of the average bit-rate and the maximum bit-rate of the speech encoder, the bit-rate 112 from the encoder can be targeted to a given level.

Figure 4:
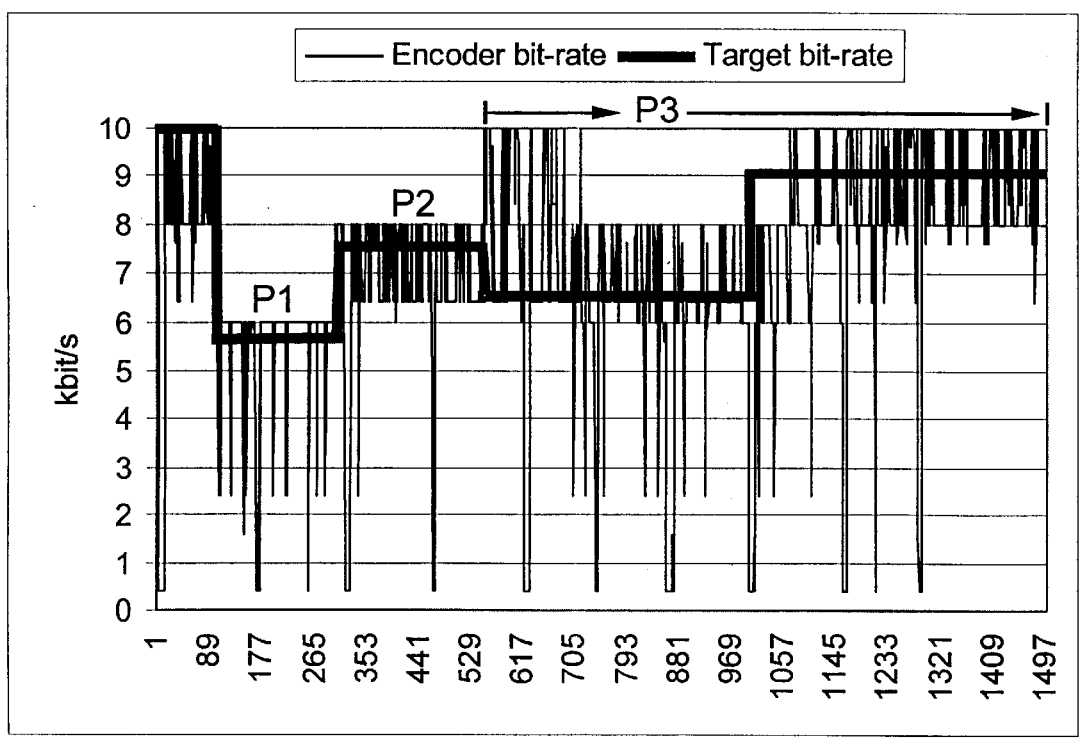
FIG. 4 illustrates the results from an average bit-rate control experiment for a speech encoder.

FIG. 4 illustrates the results from an average bit-rate control experiment for a speech encoder. In FIG. 4 the target and actual bit-rates of the encoder are studied in approximately 1500 consecutive frames. During the period P1 (frames 100–300) the maximum bit-rate is set to 6 kbits/s and during the period P2 (frames 300–550) the maximum bit-rate is set to 8 kbits/s. In period P3 (frames 550–1000) the maximum bit-rate is set to 10 kbits/s and the target average bit-rate has been set to lower levels (6 kbits/s and 9 kbits/s). As can be seen from FIG. 4, the influence of the average and maximum bit-rate controls on the speech encoder is relatively effective.

Videophone applications, where the bit-rates of both speech and video encoders are controllable, do exist, but the bit-rates of the different media types are generally separately controlled by multiplexer buffer space. Such a solution can be found e.g. in the reference of Takahiro Unno, Thomas P. Barnwell, Mark A. Clements: "The multimodal multipulse excitation vocoder" ICASSP 97 Munich Germany, Apr. 21–24, 1997. The status of the multiplexer buffer, anyhow, indicates only the short-term situation of the multiplexing process, and therefore cannot give information on the longer-term behaviour of bit-streams. A silent moment in speech would cause a momentary increase in the buffer space, but since no further knowledge about the duration of that situation exists, adaptation of either of the encoders to such a situation would not be useful. In some situations (e.g. in danger of an overflow), short-term reduction of temporal resolution is necessary, but for further long-term optimisation of the multiplexing function and especially of the adjustment between proportions of different bit-streams, more interactive control operations are necessary.

Figure 5:
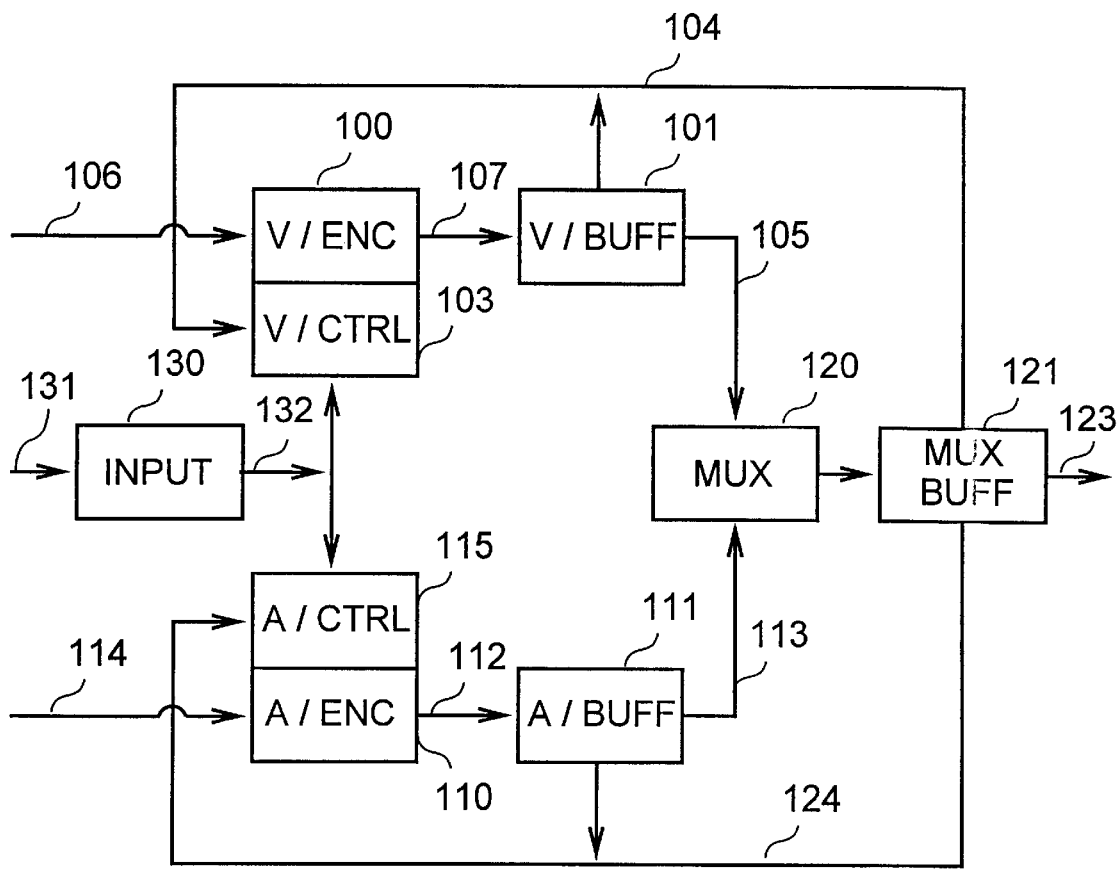
FIG. 5 illustrates the control functions in a multimedia terminal according to the invention.

The embodiment of FIG. 5 illustrates the control functions in a multimedia terminal according to the invention. The video encoder 100 is provided with a video bit-rate control element 103 that controls the operation of video encoder 100 according to the input control information. Correspondingly the speech encoder 110 is provided with a speech bit-rate control element 115 that controls the operation of the speech encoder 110 according to the input control information. Further to the prior art solution of FIG. 1, the terminal also comprises an input element 130 for transferring preference information 131 that defines the preferred proportions between different media types in the multiplexed bit-stream 123. The information is preferably transformed into control information 132 that is input directly or indirectly to the control elements 115, 103 of the encoders.

The preference information 131 provided to the input element 130 can originate from many different sources. The input can come from the user of the transmitting terminal, wherein the input element is part of the user interface of the terminal. This means, for example, a combination of a keyboard, a screen and appropriate software to transform the commands given by the user into a formatted preference indication. The preference in such a solution can also be adjusted e.g. with a help of a slide switch, where positioning the switch at one end means full preference for high quality voice and positioning the switch at the opposite end means full preference for high quality video, and positioning the switch somewhere in between indicates the direction of trade-off between speech and video. The input can also come from some external source, e.g. from the receiving user, wherein the input element is a part of the receiving functions of the terminal. This approach will be considered in more detail in connection with later embodiments of the invention.

In the embodiment of FIG. 5, average bit-rate control and control of maximum bit-rate is used to control the operation of the encoders 100, 110. The preference indication 131 indicates the preferred combination of the bit-streams in the multiplexed bit-stream, and the possible options comprise any combination from full subsidiarity (0%) to full preference (100%) to one bit-stream, including any trade-off combination therebetween. The preference information is transformed into control information 132, in this embodiment comprising the target values for maximum bit-rate and average bit-rate. Said control information 132 is input to the speech and video bit-rate control units 103, 115. The speech bit-rate control unit 115 and the video bit-rate control unit 103 are arranged to adjust the target bit-rates of encoding according to the preferred proportions set by the preference indication. After this the encoders are arranged to operate on said target bit-rate levels. In this embodiment, if the preference is on high speech quality, the input element 130 outputs control information 132 comprising relatively high average bit-rate and maximum bit-rate values for the speech encoder, and relatively low target bit-rate and maximum bit-rate values for the video encoder. If the preference is on high video quality, the input element 130 outputs relatively low average bit-rate and maximum bit-rate values for the speech encoder 110, and relatively high average bit-rate and maximum bit-rate for the video encoder 100. The speech encoder 110 is arranged to adjust the bit-rate by e.g. adjusting the accuracy of quantization or the choice of codebooks, as explained earlier. The video encoder 100 is arranged to adjust its spatial and temporal resolution in a manner known to a person skilled in the art and as explained earlier, to meet the target bit-rates set according to the preference indication.

By controlling bit-streams in this way, the operations of the encoders can be adjusted to the current purpose and situation of the connection. Also the limited transmission capacity is more optimally used compared with prior art solutions. This draws from the fact that in typical prior art solutions, whenever the target bit-rate and target-frame rates are met, the video encoder is arranged to encode at a constant level. Because it does not have any information on the behaviour of the speech encoder at hand, and therefore does not know how long space will remain available in the buffer, it is not worthwhile for the prior art video encoder to alter its temporal or spatial resolution. In the terminal according to the invention, the speech encoder 110 is bound by the limits set by the control parameters, and therefore the available transmission capacity can be more exhaustively used. Due to this joint control of speech and video bit-streams, the danger of buffer overflow will also decrease, and consequently the buffer space can, in an optimal case, be reduced, thereby also decreasing the transmission delay.

Figure 6:
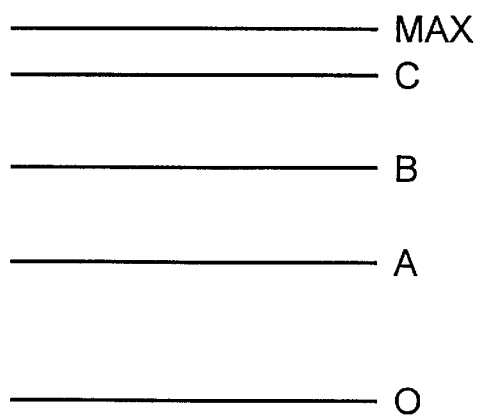
FIG. 6 illustrates levels used as thresholds in an embodiment of the invention.

A large video burst can happen for example when the video picture includes a scene cut, which needs to be coded as an INTRA frame. This requires as much as 5–10 times more bits per frame than targeted. In a further embodiment of the invention, the terminal is provided with means to interactively divide the actions needed to impede a multiplexer buffer overflow between different encoders. The speech encoder bit-rate feed-back loop 124 and video encoder bit-rate feed-back loop 104 are arranged to deliver information from the multiplexer buffer 121 to the audio and video bit-rate control units 115, 103 correspondingly. Optionally, a feed-back loop from the audio buffer 111 to the speech bit-rate control element 115 and a feed-back loop form the video buffer 101 to the video bit-rate control unit 103 can also be arranged. FIG. 6 illustrates levels used in an embodiment, where the means for selecting an appropriate action to prevent multiplexer buffer overflows are implemented with different thresholds A, B, and C of the multiplexer buffer 121 occupancy level. The original parameter values are set so as to keep the buffer content between thresholds A and B according to the input preference information. If the buffer occupancy level exceeds B e.g. due to a large video burst, an action to compensate the situation is needed. In the embodiment described herein the speech encoder bit-rate control element 115 is arranged to temporarily reduce the target bit-rate (e.g. average bit-rate, maximum bit-rate or both) of the speech encoder according to the information received from the speech bit-rate feed-back loop 124 from the multiplexer buffer 121. The bit-rate of the speech encoder can in this way be adjusted to accomodate sudden bursts from the video encoder, but only to a certain limit without noticeably degrading the quality of the transmitted speech. Beyond this limit, some actions will be needed in the video encoder. If the buffer occupancy level exceeds the threshold C, the video encoder 100 is arranged to adjust its temporal resolution by skipping some frames, according to the information received from the video bit-rate feed-back loop 104 from the multiplexer buffer 121. After the burst is processed, the target bit-rates are restored to comply with the given preferences.

Figure 7:
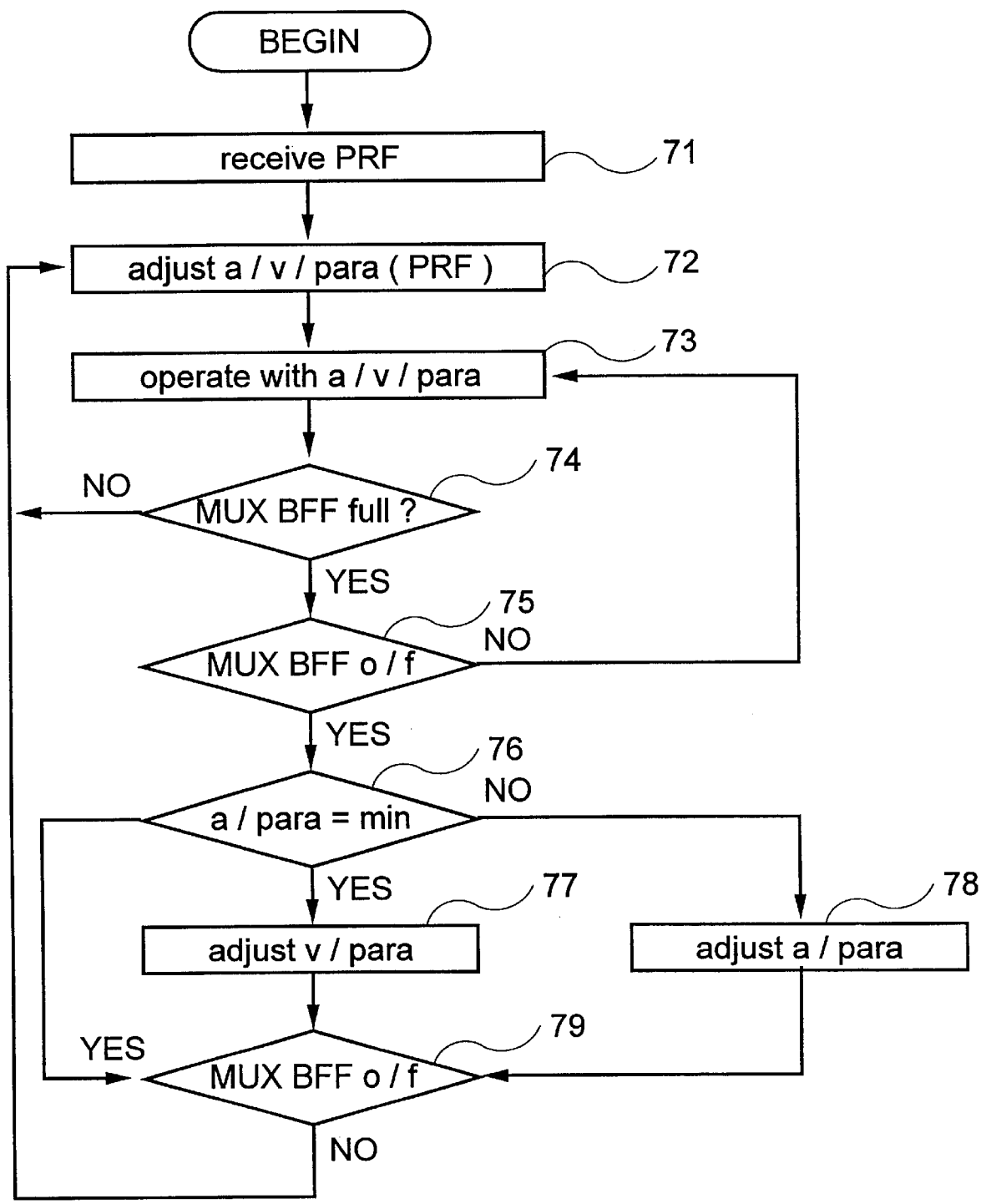
FIG. 7 illustrates a method according to the invention.

The flow chart of FIG. 7 illustrates an embodiment of the invented method for controlling encoding operations in a multimedia terminal according to the invention. In step 71 the preference information 131 is received in the input element 130 and in step 72 target values for audio and video bit-rates 112, 107 are adjusted according to the received preference information. The terminal will then operate according to the target bit-rates (step 73). If there seems to be space available in the multiplexer buffer 121, i.e. the multiplexer buffer is not full (step 74), the target values for audio and video bit-rates 112, 107 are readjusted, still complying with the received preference information 131. The readjustment can involve the parameters of either or both of the encoders 100, 110, preferably according to a certain predefined scheme. i.e. if video is preferred, the target values for video encoding will be increased, or if speech is preferred, the target values for speech encoding will be increased. When the multiplexer buffer is sufficiently full, but no overflow is detected (step 75), the terminal operates according to the current target bit-rates. When an overflow is detected, a certain predefined scheme to manage the situation is followed. Preferably said scheme operates in accordance with the preference information 131 and can even be determined from it. In this embodiment a check is made to determine whether the audio buffer is already operating at a predefined minimum level (step 76). Until this minimum level is reached, the target values for audio bit-rate are adjusted (step 78). After the minimum level is reached, the target values of video bit-rate are adjusted (step 77) e.g. by skipping one or more frames. This adjustment continues as long as the overflow situation continues (step 79). When the overflow is finished, the audio and video control parameters are readjusted according to the current preference information (step 72).

Figure 8:
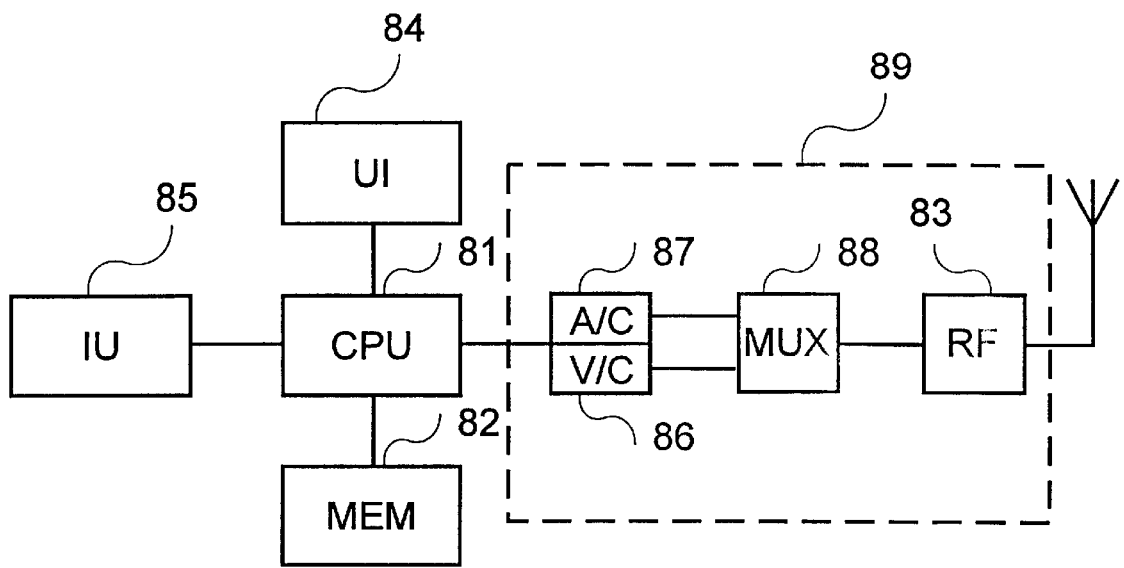
FIG. 8 illustrates the functional modules of an embodiment for a multimedia terminal according to the invention.

FIG. 8 illustrates the functional modules of an embodiment for a multimedia terminal according to the invention. A Central Processing Unit 81 controls the blocks responsible for the mobile station's different functions: a Memory (MEM) 82, a Radio Frequency block (RF) 83, a User Interface (UI) 84 and an Interface Unit (IU) 85. The CPU is typically implemented with one or more functionally interworking microprocessors. The memory preferably comprises a ROM (Read Only Memory), a RAM (Random Access Memory) and is generally supplemented with memory supplied with the SIM User Identification Module. In accordance with its program, the microprocessor uses the RF block 83 for transmitting and receiving signals on the radio path. Communication with the user is managed via the UI 84, which typically comprises a loudspeaker, a display and a keyboard. The Interface Unit 85 provides a link to a data processing entity, and it is controlled by the CPU 81. The data processing entity may be e.g. an integrated data processor or external data processing equipment. The mobile terminal according to the invention also comprises at least two codecs 86, 87, one for video (86) and one for voice data (87). A codec preferably comprises an encoder and a decoder for encoding and decoding data. The mobile terminal also comprises a multiplexer 88 for generating a composite bit-stream comprising the separate bit-streams output by the different encoders and control information, and for generating decomposed bit-streams for different decoders from the received bit-stream. The multiplexer is arranged to output the encoded multiplexed bit-streams into a multiplexer buffer. The codecs 86, 87 comprise control means and are connected by control data feed-back loops to control the operations of the encoding processes as described in connection with FIG. 5. Though only two bit-streams are presented in FIG. 8, more than two bit-streams (e.g. control data, data for data applications, etc. re: FIG. 2) can be involved. Then a target for each bit-stream is set according to the preference information received by the terminal, and a policy for making adjustments to those targets in case of multiplexer buffer overflow is defined, in a manner described earlier.

Figure 9:
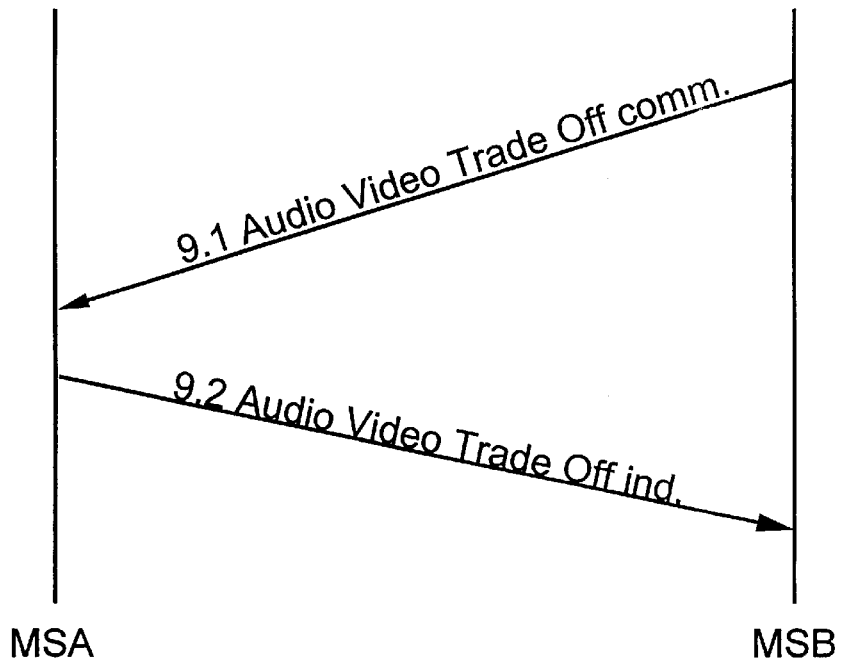
FIG. 9 illustrates an example of signalling that can be used to facilitate control input according to the invention from the receiving terminal.

The input element 130 in a mobile terminal can be arranged to receive preference information through the user interface 84 as described in FIG. 5. The input element 130 in a mobile terminal can also be arranged to receive preference information from the terminal it is communicating with using control signals provided by the communication protocol used between the two terminal entities. In general, a protocol is a formal statement of the procedures that are adopted to ensure communication between two or more functions. The latest ITU-T (ITU Telecommunication Standardization Sector) videophone standards, such as ITU-T H.324 and H.323 use the H.245 control protocol to initialise a connection, i.e. open logical channels, exchange capability sets etc. This control protocol can also be used to send commands and indications during the connection. FIG. 9 illustrates an example of signalling that can be used in said protocols to facilitate control input according to the invention from the receiving terminal. Since this signalling is substantially transparent to the network elements between the transmitting and receiving terminals MSA and MSB, only the terminals are shown in the figure.

When establishing a connection, the first terminal MSA sends its terminal capability set to MSB with H.245 capability exchange procedures. The terminal capability set contains a field indicating terminal's capability of varying the trade-off between audio and video bit-streams according to the invention. The second terminal MSB comprises a user interface that enables the user of terminal MSB to indicate his preference between speech and video bit-streams as described earlier. The preferences are mapped to a range of e.g. integer values 1 . . . N where preference to audio is indicated by one extreme and preference to video is indicated by the other extreme. Whenever the user of terminal MSB wishes to change his preference, he gives an indication to the terminal through the user interface, and the terminal MSB is arranged to transform the preference e.g. into an integer value and send an AudioVideoTradeoff command comprising said integer value to the terminal MSA (signal 9.1). The first terminal MSA is arranged to receive the command, adjust the control parameters of audio and video encoders as described earlier, and optionally to generate an acknowledgement (H.245 indication) to the second terminal MSB indicating the current preference used in the terminal MSA end (signal 9.2). In this type of an embodiment the user of terminal MSB may have the possibility to adjust the preference related to the signals he is transmitting, as well as related to the signals he is receiving.

Figure 10:
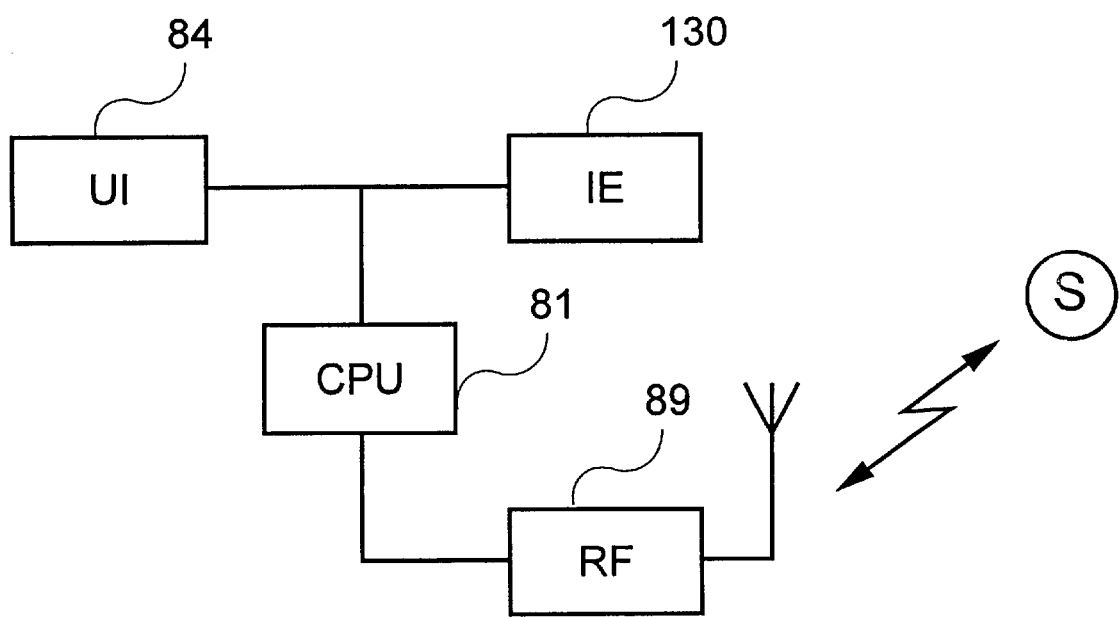
FIG. 10 illustrates different sources for preference information.

FIG. 10 illustrates sources of preference information for a multimedia terminal according to the invention capable of at least audio, video and other kinds of data transmission. The input element 130 can receive preference information from the user of the terminal as explained in connection with FIG. 5. The input element can receive the information from an external source S as explained in connection with FIG. 9. The external source S can be any external source, including a computer exchanging statistical data with the terminal. In such a case, the computer could automatically indicate a full preference for data, thereby avoiding unnecessary allocation for audio and video bit-streams. The preference information can also come from the control unit CPU 81 of the terminal as a result or a side-product from a more general terminal control operation.

Although the invention has been illustrated and described in terms of a preferred embodiment, those persons of ordinary skill in the art will recognise modifications to the preferred embodiment may be made without departure from the scope of the invention as claimed below.

What is claimed is:

1. A multimedia terminal comprising:
   a first encoder for encoding a first signal for producing a first bit-stream of a first media type and having a first bit-rate;
   a second encoder for encoding a second signal for producing a second bit-stream of a second media type and having a second bit-rate;
   a multiplexer for combining at least the first and the second bit-streams into a third bit-stream;
   an input element for receiving preference information, said input element being coupled to the first encoder and the second encoder, said preference information indicating a preferred combination of the first and the second media types in the third bit-stream and affecting the first and the second bit-rates;
   wherein said first encoder comprises a first control element for receiving first control information, and controlling the first bit-rate according to said first control information;
   said second encoder comprises a second control element for receiving said first control information, and controlling the second bit-rate according to said first control information;
   said input element is arranged to provide said first control information generated according to said preference information to the first and the second control elements;
   the second control element comprises a first feed-back loop, comparison means, and a controller;
   said first feed-back loop is arranged to transfer information on an actual averaged bit-rate of the second bit-stream to the comparison means;
   said comparison means is supplied with a target average bit-rate, arranged to calculate the difference between the actual averaged bit-rate of the second bit-stream and the target average bit-rate, and to provide the calculated difference to the controller;
   said controller is arranged to output a control signal to the second encoder, as a response to receiving said calculated difference; and
   said second encoder is arranged to adjust the bit-rate of the second bit-stream according to the received control signal from the controller.

2. A multimedia terminal according to claim 1, comprising
   a multiplexer buffer for storing data from the multiplexer for transmission; and
   said multiplexer buffer is connected to a second feed-back loop arranged to transfer information on the occupancy level of the multiplexer buffer, said occupancy level indicating the current amount of data stored in the buffer.

3. A multimedia terminal according to claim 2, wherein the second control element is arranged to further adjust the bit-rate of the second bit-stream according to the feed-back information received from the second feed-back loop.

4. A multimedia terminal according to claim 2, wherein the first control element is arranged to further adjust the bit-rate of the first bit-stream according to the feed-back information received from the second feed-back loop.

5. A multimedia terminal according to claim 2, wherein the first control element is arranged to adjust the temporal resolution of video encoding according to the feed-back information received from said second feed-back loop.

6. A multimedia terminal according to claim 5, wherein the multiplexer buffer is provided with a first threshold; and either of the first and second control elements is arranged to adjust the bit-rate of the corresponding bit-stream, as a response to the multiplexer buffer occupancy level exceeding the first threshold.

7. A multimedia terminal according to claim 6, wherein the second encoder is a speech encoder, and the second encoder is arranged to adjust the bit-rate of the second bit-stream, as a response to the multiplexer buffer occupancy level exceeding the first threshold.

8. A multimedia terminal according to claim 7, wherein the multiplexer buffer is provided with a second threshold for multiplexer buffer occupancy level, said second threshold being higher than the first threshold; and the first encoder is arranged to adjust the bit-rate of the first bit-stream, as a response to the multiplexer buffer occupancy level exceeding the second threshold.

9. A multimedia terminal according to claim 1, wherein the first encoder is a video encoder; and the first control element is arranged to adjust the spatial resolution of video encoding according to the control information received from the input element.

10. A multimedia terminal according to claim 1, comprising a video codec and a speech codec, and means for communicating with a mobile communication network.

11. A multimedia terminal according to claim 10, comprising a user interface for inputting the preference information.

12. A multimedia terminal according to claim 11, wherein the user interface comprises a slide switch.

13. A multimedia terminal according to claim 10, comprising means for receiving preference information from the mobile communication network.

14. A protocol for communicating between a first multimedia terminal and a second multimedia terminal, said first multimedia terminal comprising a first encoder for encoding a first signal for producing a first bit-stream of a first media type and having a first bit-rate;

a second encoder for encoding a second signal for producing a second bit-stream of a second media type and having a second bit-rate;

a multiplexer for combining the first and the second bit-streams into a third bit-stream;

an input element for receiving preference information, said input element being coupled to the first encoder and the second encoder;

said protocol comprising formatted signals for transferring information between the first and the second multimedia terminals; and a message for indicating the capability of the first multimedia terminal to control the first and the second bit-rates according to the preference information received by the first multimedia terminal, said preference information indicating a preferred combination of the first and the second media types in the third bit-stream and affecting the first and the second bit-rates; and wherein said first encoder comprises a first control element for receiving first control information, and controlling the first bit-rate according to said first control information;

said second encoder comprises a second control element for receiving said first control information, and controlling the second bit-rate according to said first control information;

said input element is arranged to provide said first control information generated according to said preference information to the first and the second control elements;

the second control element comprises a first feed-back loop, comparison means, and a controller;

said first feed-back loop is arranged to transfer information on an actual averaged bit-rate of the second bit-stream to the comparison means;

said comparison means is supplied with a target average bit-rate, arranged to calculate the difference between the actual averaged bit-rate of the second bit-stream and the target average bit-rate, and to provide the calculated difference to the controller;

said controller is arranged to output a control signal to the second encoder, as a response to receiving said calculated difference; and said second encoder is arranged to adjust the bit-rate of the second bit-stream according to the received control signal from the controller.

15. A protocol according to claim 14, the protocol further comprising a message for delivering the preference information from the second multimedia terminal to the first multimedia terminal.

16. A method for controlling multiplexing of a multimedia transmission comprising the steps of:

encoding a first signal for producing a first bit-stream of a first media type and having a first bit-rate;

encoding a second signal for producing a second bit-stream of a second media type and having a second bit-rate;

combining at least the first and the second bit-streams into a third bit-stream;

receiving preference information, said preference information indicating a preferred combination of the first and the second media types in the third bit-stream; and adjusting the first and the second bit-rates according to the received preference information;

wherein the step of encoding the first signal is accomplished by a first encoder having a first control element for receiving first control information, the method including a step of controlling the first bit-rate according to said first control information;

the step of encoding the second signal is accomplished by a second encoder having a second control element for receiving said first control information, the second control element comprising a first feed-back loop, comparison means, and a controller; the method including a step of controlling the second bit-rate according to said first control information;

the method further comprises steps of transferring, via said first feed-back loop, information on an actual averaged bit-rate of the second bit-stream to the comparison means;

supplying to said comparison means a target average bit-rate, and calculating a difference between the actual averaged bit-rate of the second bit-stream and the target average bit-rate, and providing the calculated difference to the controller;

outputting a control signal via said controller to the second encoder, as a response to receiving said calculated difference; and adjusting the bit-rate of the second bit-stream by said second encoder according to the received control signal from the controller.

* * * * *